United States Patent
Hoffman

(10) Patent No.: US 10,162,519 B2
(45) Date of Patent: Dec. 25, 2018

(54) VIRTUAL CONTENT WHEEL

(71) Applicant: Michael F. Hoffman, Loudonville, NY (US)

(72) Inventor: Michael F. Hoffman, Loudonville, NY (US)

( * ) Notice: Subject to any disclaimer, the term of this patent is extended or adjusted under 35 U.S.C. 154(b) by 692 days.

(21) Appl. No.: 14/670,655

(22) Filed: Mar. 27, 2015

(65) Prior Publication Data

US 2015/0277755 A1  Oct. 1, 2015

Related U.S. Application Data

(60) Provisional application No. 61/971,983, filed on Mar. 28, 2014.

(51) Int. Cl.
| | | |
|---|---|---|
| *G06Q 30/00* | (2012.01) | |
| *G06F 3/0488* | (2013.01) | |
| *G06Q 30/02* | (2012.01) | |
| *G06Q 50/00* | (2012.01) | |
| *G06F 3/0482* | (2013.01) | |

(52) U.S. Cl.
CPC ........ *G06F 3/04886* (2013.01); *G06F 3/0482* (2013.01); *G06Q 30/0269* (2013.01); *G06Q 30/0273* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,730,424 B2 * | 6/2010 | Citrin | .......... | G06F 3/0482 715/828 |
| 2003/0157980 A1 * | 8/2003 | Loose | .......... | G07F 17/3202 463/20 |
| 2003/0220134 A1 * | 11/2003 | Walker | .......... | G07F 17/3213 463/20 |
| 2007/0136669 A1 * | 6/2007 | Kwon | .......... | G06F 3/0482 715/721 |
| 2007/0149281 A1 * | 6/2007 | Gadda | .......... | G07F 17/32 463/34 |
| 2008/0270941 A1 * | 10/2008 | Kim | .......... | G06F 3/04842 715/830 |
| 2010/0073303 A1 * | 3/2010 | Wu | .......... | G06F 3/0485 345/173 |
| 2012/0210260 A1 * | 8/2012 | Bederson | .......... | G06F 3/0488 715/765 |
| 2013/0137497 A1 * | 5/2013 | Werkstell | .......... | A63F 1/00 463/13 |
| 2013/0290116 A1 * | 10/2013 | Hepworth | .......... | G06Q 30/02 705/14.73 |
| 2015/0141118 A1 * | 5/2015 | Lefebvre | .......... | A63F 13/69 463/22 |
| 2015/0277755 A1 * | 10/2015 | Hoffman | .......... | G06F 3/04886 705/12 |

\* cited by examiner

*Primary Examiner* — Matthew T Sittner
(74) *Attorney, Agent, or Firm* — Michael F. Hoffman; Hoffman Warnick LLC

(57) ABSTRACT

A virtual wheel interface. The interface includes: a display area for displaying an edge-on view of a plurality of adjacent content frames located about an outer edge of a rotatable n-sided polygonal prism; a system for rendering a three dimensional rotation of the outer edge about a central axis of the n-sided polygonal prism in response to an input signal; and a system for dynamically reorienting content items appearing in the plurality of adjacent content frames in response to a switch between a landscape mode and a portrait mode.

10 Claims, 9 Drawing Sheets

VIRTUAL CONTENT WHEEL

PRIORITY

This application claims benefit to provisional application entitled VIRTUAL CONTENT WHEEL FOR SOCIAL MEDIA filed on Mar. 28, 2014, Ser. No. 61/971,983.

BACKGROUND

1. Technical Field

This invention relates generally to systems for presenting social media content, and more particularly relates to a system and method of implementing a virtual content wheel for presenting social media.

2. Related Art

Currently, social media (SM) content is presented in a variety of forms. In SM applications such as FACEBOOK and TWITTER, SM content is presented to users as a temporal stream of content frames. In other SM applications such as PINTEREST, SM content can further be presented in categories or "Pins" to enhance the user experience. Regardless, current approaches require a significant investment of "socialization time" for the user to fully enjoy the experience, e.g., establishing user accounts, forming connections, weeding through content, etc.

Furthermore, injecting meaningful ad content into current SM presentations leaves much to be desired. Oftentimes, users are presented with ad content that does not correlate the particular interests of the user.

SUMMARY

In a first aspect, the invention provides a virtual wheel content system for generating content sets for deployment to remotely running virtual wheel applications, comprising: a content ingestor for receiving and storing content items, and for linking each content item with at least one of a plurality of predefined zones; an ad manager for pricing ingested advertising content items; a content manager that assembles a unique content set for each predefined zone, wherein each unique content set contains a predetermined number of content items, and wherein each unique content set is assembled based on rankings of the content items; and a content server that serves the unique content sets to remotely running virtual wheel applications.

In a second aspect, the invention provides a program product stored on a computer readable storage medium, which when executed by a computer system, renders a virtual content wheel, and comprises: program code for rendering a virtual wheel, wherein the virtual wheel includes a plurality of content frames rotationally viewable about an outer edge of the virtual wheel; program code for loading content items into the content frames of the virtual wheel; and program code for causing the virtual wheel to rotate in response to an external input.

In a third aspect, the invention provides a virtual wheel interface, comprising: a display area for displaying an edge-on view of a plurality of adjacent content frames located about an outer edge of a rotatable n-sided polygonal prism; a system for rendering a three dimensional rotation of the outer edge about a central axis of the n-sided polygonal prism in response to an input signal; and a system for dynamically reorienting content items appearing in the plurality of adjacent content frames in response to a switch between a landscape mode and a portrait mode.

In a fourth aspect, the invention provides a computerized method for generating content sets for deployment to remotely running virtual wheel applications, comprising: receiving and storing content items, and for linking each content item with at least one of a plurality of predefined zones; pricing ingested advertising content items; assembling a unique content set for each predefined zone, wherein each unique content set contains a predetermined number of content items, and wherein each unique content set is assembled based on rankings of the content items; and serving the unique content sets to remotely running virtual wheel applications.

DETAILED DESCRIPTION

Figure 1:
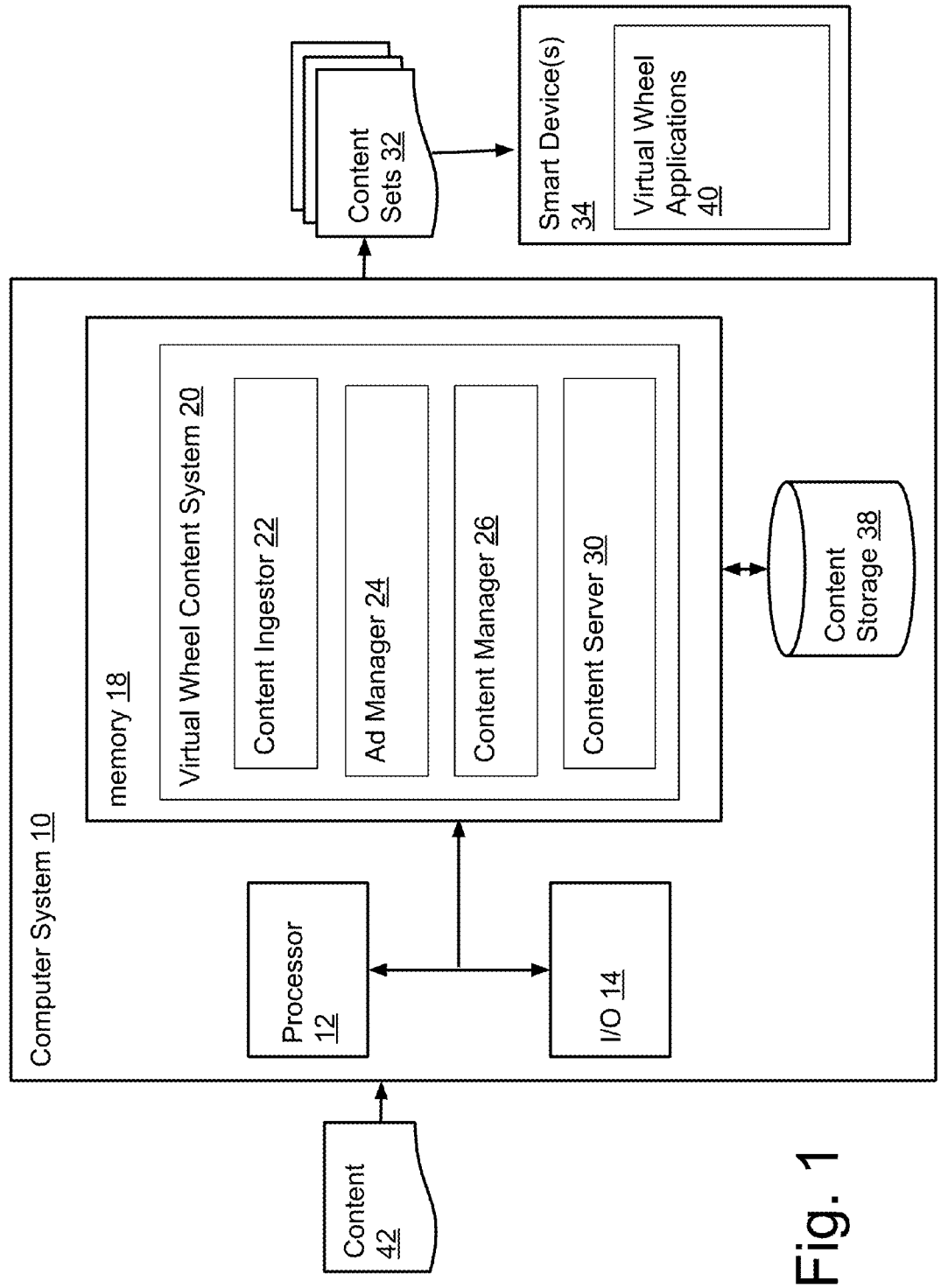
FIG. 1 depicts a computer system having a virtual wheel content system in accordance with an embodiment of the invention.

Referring now to the drawings, FIG. 1 depicts a computer system 10 that includes a virtual wheel content system 20 that inputs and processes content 42 and serves content sets 32 to a remote computing platform, e.g., a smart device 34, tablet, personal computer, etc., running instances of virtual wheel application 40. Each content set 32 is created with a group of content items selected from the inputted content 42. Virtual wheel application (APP) 40 provides a content interface, e.g., on smart devices 34, for displaying a content set 32 about a virtual wheel. Each "active" virtual wheel application 40 is associated with one of a plurality of predefined zones. An application is for example considered "active" when it is running on a remote computing platform.

In one embodiment, each predefined zone receives at least one unique content set, i.e., all instances of the virtual wheel application 40 associated with a common zone will receive the same content set. Each predefined zone is defined by some space or category of information, e.g., zones may be categorized as geospatial areas, subject matter topics, etc. In the case of predefined geospatial zones, content sets 32 can be determined based on the geospatial location of the device running virtual wheel application 40. Thus for example, users (with smart devices 34 running APP 40) located in the Napa Valley zone will receive a first content set, while users located in the Yankee Stadium zone will receive a second content set.

In one illustrative embodiment described herein, virtual wheel content system 20 generally includes: (1) a content ingestor 22 for receiving content, e.g., from users, advertisers, automated processes, etc., and storing the content in content storage 38; (2) an ad manager 24 for managing and pricing advertising content; (3) a content manager 26 that creates each content set 32 from the inputted content 42, including determining the size and makeup of each content set 32; and (4) a content server 30 that serves the content sets 32 to virtual wheel applications 40.

Figure 4:
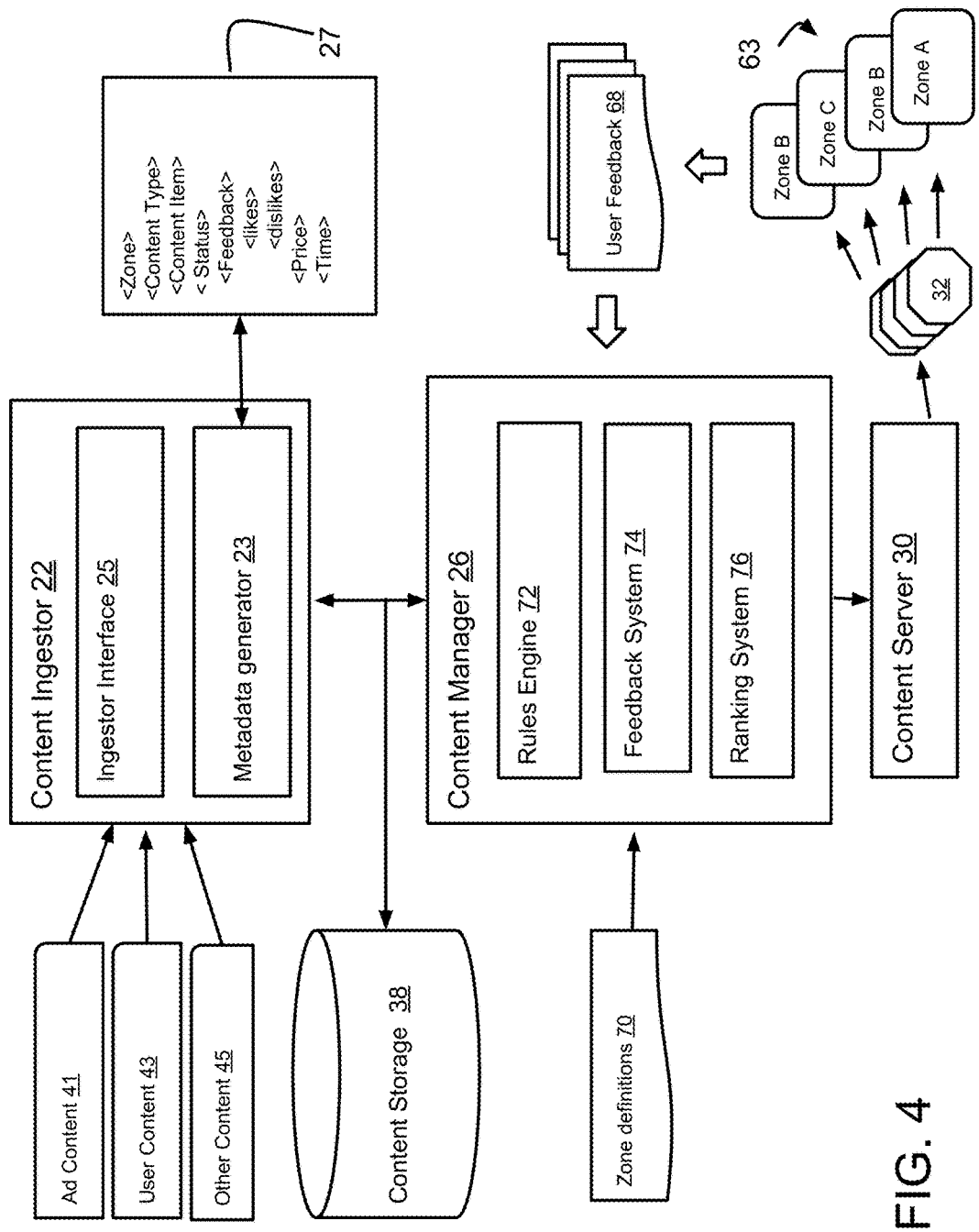
FIG. 4 depicts an architectural view of a content ingestor and content manager in accordance with an embodiment of the invention.
Figure 5:
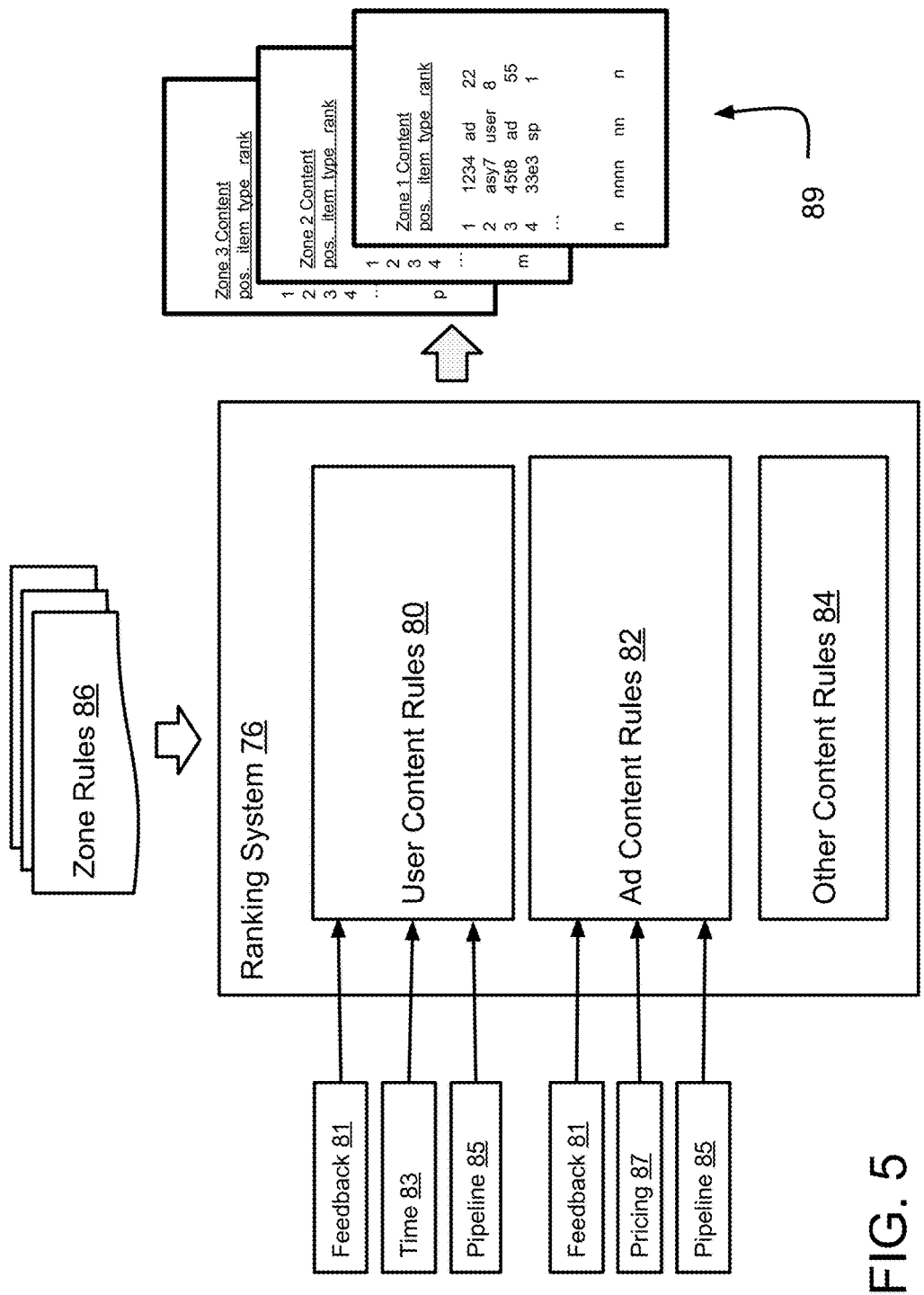
FIG. 5 depicts a ranking system in accordance with an embodiment of the invention.

As described in more detail in FIGS. 4 and 5, content manager 26 may utilize a rules engine 72, feedback system 74 and ranking system 76 to select content items for each content set 32. As will be appreciated, each content set 32 may be dynamic in nature, meaning that its size and makeup are regularly changing based on rules established within the content manager 26.

Figure 2:
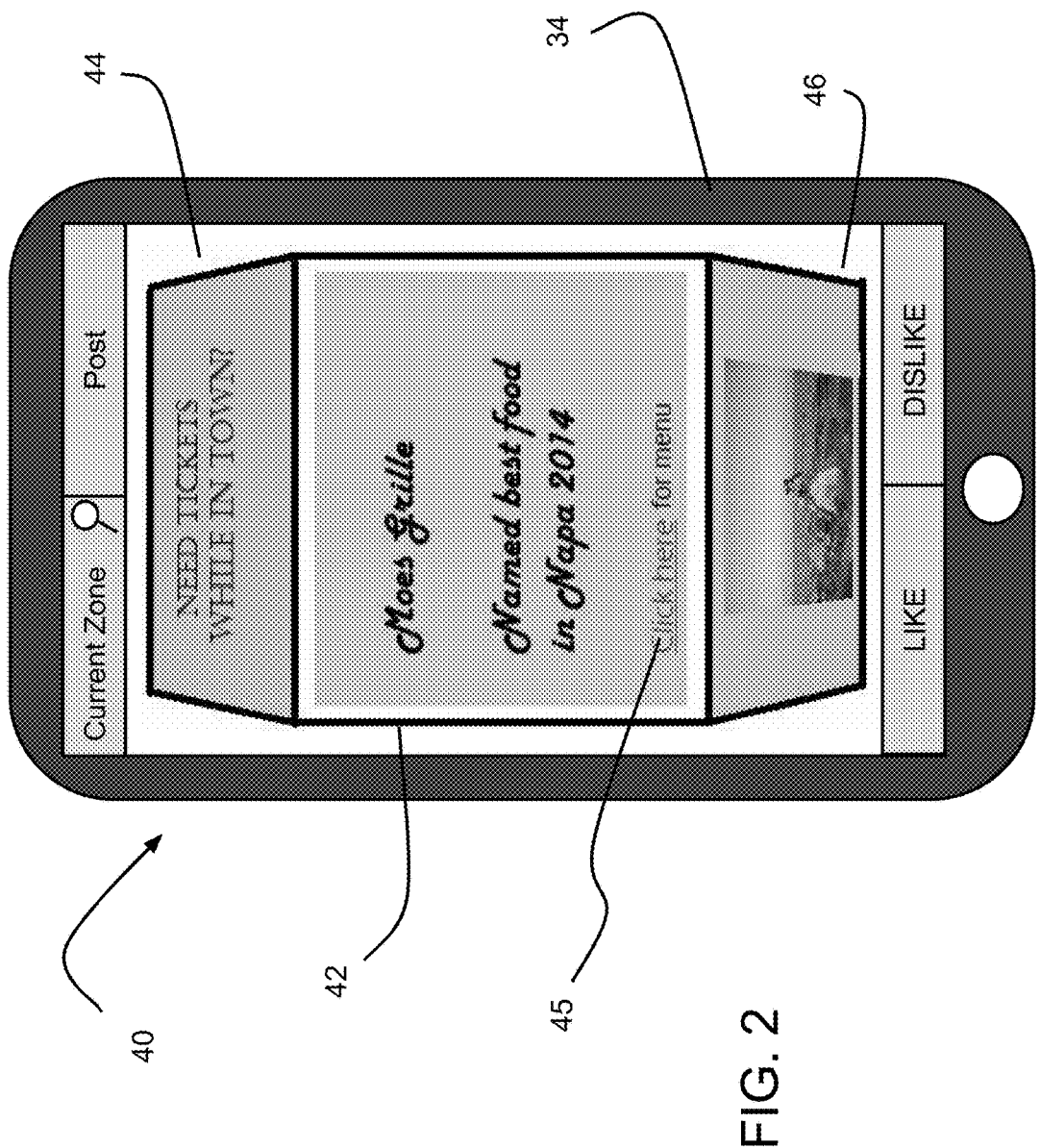
FIG. 2 depicts a virtual wheel APP for a smart device in accordance with an embodiment of the invention.

FIG. 2 depicts an illustrative smart device 34 running a virtual wheel application 40. As can be seen, virtual wheel application 40 provides an interface that displays content frames 42, 44, 46, edge-on, as though they reside about the edge of a wheel. Accordingly, rather than scrolling through a linear content stream, users navigate the virtual content wheel by moving the content wheel (e.g., up or down in portrait mode as shown) to rotate through content frames. In this case, content frame 42 is positioned in a primary frame position, such that it is displayed in a straight-on, i.e., two dimensional (2D) perspective at the center of the application 40, while frames 44, 46 are shown in adjacent frame positions having a skewed, i.e., three dimensional (3D) perspective, giving the user the impression that the user is rotating and viewing frames 42, 44, 46 along an edge of a wheel. In one embodiment, frames may "click" into place with a lock-in action. Thus, when content frame 42 is rotated into the primary frame position, the content frame will automatically come to rest in the straight-on perspective. A sound and/or tactile response may accompany the action. Adjacent frame positions 44, 46 may be visually skewed using any technique, e.g., the content may be compressed into a trapezoidal form to give the impression that the content is vanishing. Moreover, the skewing may be dynamic in nature such that as the wheel rotates, the skewing becomes more or less pronounced.

In one embodiment, each content frame 42, 44, 46 has a common, fixed, rectangular size when appearing in the primary frame position. Thus, in a virtual sense, each frame occupies the same amount of space along the edge of the virtual wheel.

Depicted content items may be interactive in nature, e.g., the user can click on the content item, item within the frame, or hypertext link 45 to create an interactive response, such as launch a browser and point to the link 45, display a photo in a photostream, launch a video player, call a phone number, launch another application, launch another wheel of content, etc.

In addition to moving the virtual wheel, users may vote for a displayed content item (e.g., like/dislike, thumbs up/thumbs down, etc.) using any type of input mechanism, e.g., one or more buttons, motion sensors, audio input, facial recognition, etc. In this depicted example, the user can click either a like or dislike button that is not part of the content frame. The collection of like/dislike information may be utilized to rank content items, as described herein.

Other features may include the ability to post content, display the current zone, search and view other zone content, etc. A feature of the virtual wheel is that it in fact causes the smart device 34 to operate in a technically advanced manner by displaying information in a more useful format. Accordingly, the operation of the smart device 34 with the virtual wheel application running essentially provides an enhanced computing platform.

Figure 3:
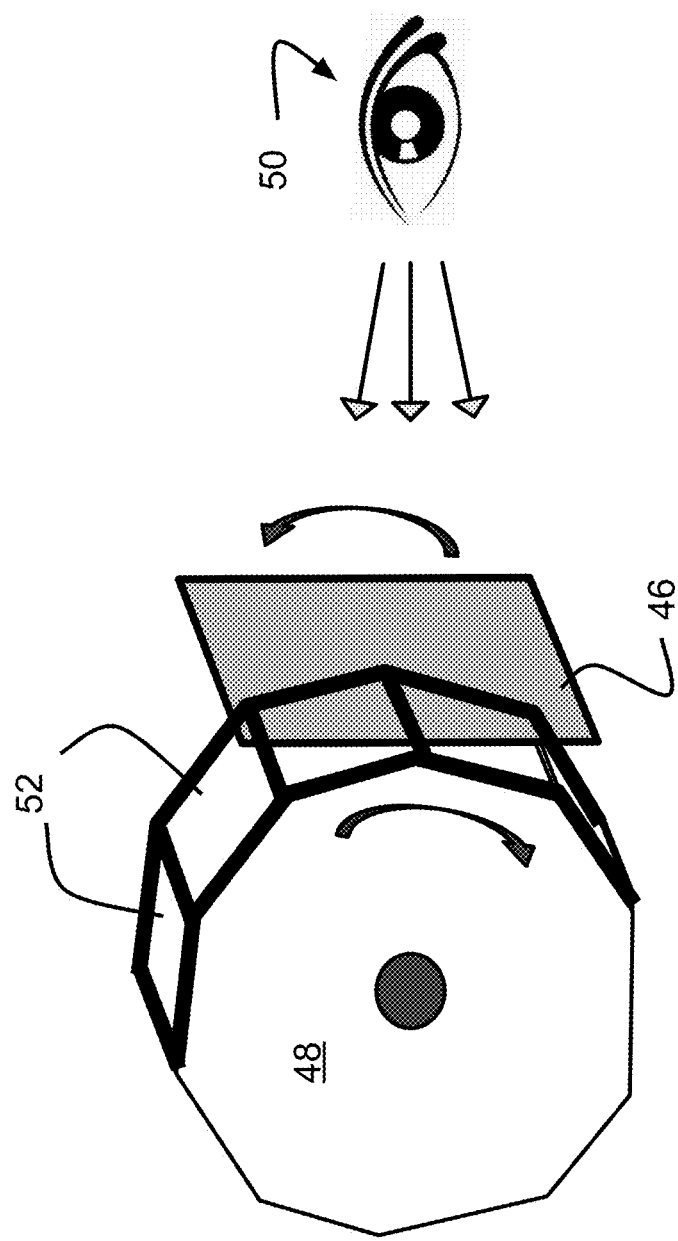
FIG. 3 depicts a conceptual view of a virtual wheel in accordance with an embodiment of the invention.

FIG. 3 shows the concept of the virtual content wheel in which an observer 50 (i.e., user) peers through a window 46 (i.e., smart device screen) to view content frames 52 that reside about an edge of a virtual wheel 48. Although described as a wheel, virtual wheel 48 may be rendered as an n-sided polygonal prism, i.e., a polygon having three-dimensional depth, that is rotatable about a central axis. In this case, content frames 52 are presented as rectangles on outer edge of the virtual content wheel, which thus appear as flat surfaces to the observer 50. A feature of the virtual wheel is that, at a given point in time, the wheel includes a fixed number of content frames, such that content frames will be repeated once the observer 50 fully rotates the wheel. As described herein, the wheel size (i.e., number of frames) may be dynamically adjusted over time to, e.g., account for the changing demand of content items available for inclusion in the content set associated with the wheel. Although shown as a polygonal prism, it is understood that the virtual wheel may be rendered as any rotatable form, e.g., a cylinder, a disk, etc., that includes a fixed (but changeable) number of content frames into which a set of social media content can be dynamically loaded.

Viewing the virtual content wheel, a user can readily access content items specific to a predefined zone. For example, if the user entered the predefined Miami Beach zone, virtual wheel application would recognize the user's location (e.g., via GPS, triangulation, etc.) and cause a content set correlated to Miami Beach to be displayed on the virtual wheel. Once the user leaves the zone and enters a new zone, a different content set would be displayed. Further, because the content items in each content set are continuously refreshed over time, the user experience will not be stale. The user can also visit geospatial zones by searching and locating zones, e.g., based on keywords, dropdown menus, etc. Thus, the user need not actually reside in a predefined zone to view and interact with a content set associated with the zone.

In the case of a subject matter zone, the user may simply search or enter a keyword to find predefined subject matter zones of interest. For example, the user may be interested in motorcycles and locate/enter a predefined Harley Davidson zone, which will display content relevant to Harley Davidson's.

FIG. 4 shows an embodiment of how the content ingestor 22 and content manager 26 operate to create content sets 32, which are served by content server 30 to virtual wheel applications associated with predefined zones 63. In this illustrative embodiment, each content set 32 is uniquely built for a specific zone, such as a geospatial or subject matter zone. Each zone is predefined such that multiples users (running virtual wheel applications) can receive the same unique content set correlated to the zone 63. Accordingly, a universe of zones can be predefined in which each zone receives a unique content set 32. This thus allows users, using the virtual wheel application, located in or tuned into a given zone, to view an associated content set 32 tailored to the given zone.

As shown, content ingestor 22 provides an ingestor interface 25 for inputting different types of content, e.g., ad content 41, user content 43 and other content 45. Ad content 41 generally includes content uploaded by an advertiser targeting users in a particular zone. User content 43 generally includes content uploaded by a user residing within (or viewing content in) a zone, e.g., user posts or comments.

Other content 45 may include premium paid content, content reserved for special frames in a virtual content wheel, public service announcements, automatically loaded content, etc. Although not shown in FIG. 4, an ad manager is also provided to further manage ad content, such as setting prices for zones, communicating with advertisers, etc. In general, most content items are correlated with one or more zones. For instance, if a user loads a photo and comment (i.e., user content) while located in a zone predefined for Napa Valley, the content item will be correlated with the predefined Napa Valley zone. In some cases, the content item may belong to multiple zones, e.g., a Fenway Park zone and a Boston zone.

Regardless of the content type, each time a content item is inputted, the content item is linked (e.g., tagged) with metadata 74 created by metadata generator 23. Metadata 27 may for example reflect which zone or zones the content item is correlated to; the type of content; a status, e.g., whether the content item has been deployed; feedback from other users; time information, e.g., when the content item was received, when the content first appeared in a content set 32, etc.; pricing information if the content item contains ad content 41, etc. Once tagged, the content item is stored in content storage 38 to await deployment to a content set 32 by content manager 26.

Content manager 26 continuously updates the content items in each content set 32 for deployment to zones 63. Zones 63 may be defined in any manner, and in this embodiment are defined via a set of zone definitions 70, which may for instance comprises geospatial coordinates and other relevant information about the zone 63, e.g., population, size, demographics, etc. Content server 30 serves the content sets 32 to virtual wheel applications located in, or associated with, zones 63, e.g., based on GPS coordinates. Content manager 26 generally includes: (1) a rules engine 72 that determines, e.g., the size and make-up of each content set 62, e.g., how many user content items, ad content items, other content items make up the content set, ranking rules, etc.; (2) a feedback system 74 that analyzes user feedback 68, e.g., likes or dislikes; and (3) a ranking system 76 that ranks content items for each zone 63. Because each content set 32 has a fixed number of content items at a given point in time, selection of the best content items from content storage 38 for a given zone 63 may be determined based on the ranking determined by ranking system 76.

FIG. 5 shows an embodiment of ranking system 76 in further detail. In this embodiment, ranking system 76 ranks each content item within its correlated zone (or zones). For instance, all content items correlated to the predefine Napa Valley zone are assigned a ranking. Further, user content items, ad content items and other content items may be separately ranked for each zone. Once ranked, zone rules 86 determine which content items will make up the content set for each predefined zone. For example, in one example, zone rules 86 may dictate that a content set for a given zone will comprise 100 content items, with 50 of the content items comprising ad content, 45 comprising user content, and five comprising other content. In one approach, content manager 26 would cause the top 50 ranked ad content items to be selected; the top 45 user content items to be selected; and five of the other content items to be selected. As is evident, not all available content items may be selected for deployment. Instead, only the best subset of available content items are selectively deployed to enhance the user experience.

In this example, user content items are ranked based on a set of user content rules 80, ad content items are ranked based on a set of ad content rules 82 and other content items are ranked based on other content rules 84. User content rules 80 are for example ranked based on: (a) user feedback 81 (e.g., how many likes/dislikes received); (b) a time factor (e.g., how long item has been deployed, how long the item has been waiting to be deployed, etc.); and (c) the pipeline 85 of other user content items waiting to be deployed. Thus for example, if there are a large number of user content items waiting to be deployed, that will generally lower the rank of an already deployed user content item. Further, if a deployed user content item has received a lot of positive feedback, which will increase ranking. Still further, the longer a content item has been deployed, the lower its rank.

Thus, an illustrative user content ranking algorithm may be:

$$\text{Rank}=f(\text{(number of likes)}-\text{(number of dislikes)})+f\\(\text{Time waiting to be deployed})-f(\text{Time since deployed})-f(\text{Number of items in the pipeline}),$$

where $f$ is some function of $(x)$.

Ad content rules 82 may for example consider user feedback 81 as well (including likes, dislikes, and clicks, i.e., how many times users have clicked on the ad). In addition, pricing information may also be considered in ranking ad content, in which more expensive ads are ranked higher than lower cost ads. Pricing of ads is determined by ad manager 24 (FIGS. 1 and 6), which may for example price ads based on demand. Further, ad content may be ranked based on the pipeline 85 of ads waiting to be deployed, similar to user content.

Thus, an illustrative ad content ranking algorithm may be:

$$\text{Rank}=\text{(number of likes)}-\text{(number of dislikes)}+\text{(number of clicks)}+\text{(price)}-\text{(Number of items in the pipeline)}.$$

Other content rules 84 may for example display other content items based on any set of rules, e.g., based on contractual agreement with a third party, etc. Obviously, the rules, algorithms, and input factors described herein for ranking items are for illustrative purposes only, and many variations are possible.

The output of the ranking system 76 comprises ranked content sets 89 of a fixed size, ready to be served to virtual wheel applications. The arrangement of content items on a given virtual wheel can also be determined by the zone rules 86, e.g., how different content items are interspersed, how rank impacts positions on the wheel, etc. Further, zone rules 86 may also dictate how often each wheel gets refreshed, e.g., every 10 minutes, every day, etc.; when the wheel size or makeup can be changed, etc.

Figure 6:
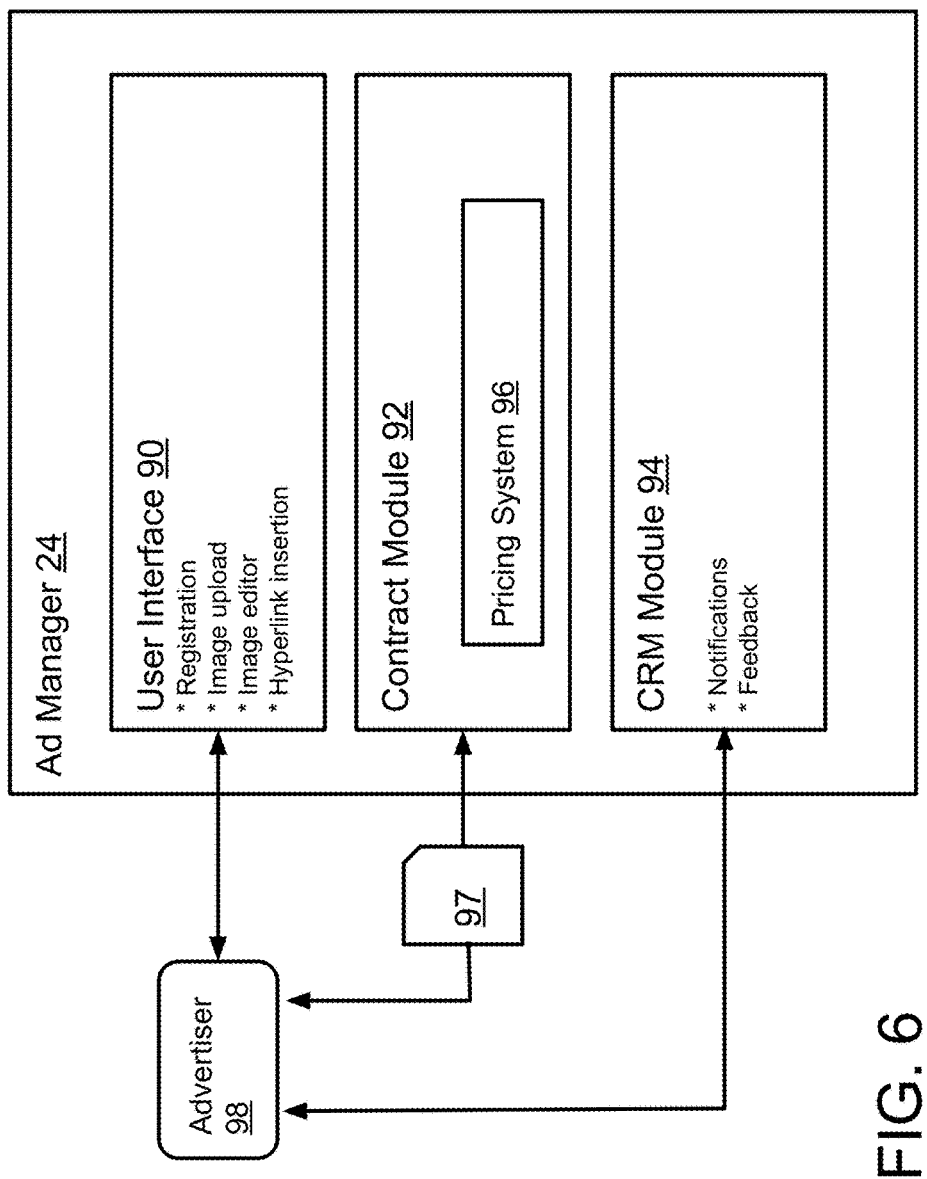
FIG. 6 depicts an Ad manager in accordance with an embodiment of the invention.

FIG. 6 depicts an illustrative implementation of ad manager 24 for ingesting, pricing and managing ad content. A feature of the virtual wheel approach is that the wheel may be implemented with a fixed or limited number of ad spots for each content set/zone. Thus, as the demand to advertise in a given zone changes, pricing can be adjusted. In one embodiment, advertising may initially be offered for a nominal cost (e.g., free in exchange for registering, for a few cents, etc.), and as the ad spots fill up the wheel, the pricing can fluctuate up and down to match demand.

Ad manager 24 generally includes: a user interface 90 for registering, uploading ad content, etc.; a contract module 92 for establishing an ad contract 97 with an advertiser 98, accepting payment, setting prices via a pricing system 96, etc.; and a CRM (customer relationship management) module 94 for communicating information to existing and potential advertisers. User interface 90 may utilize any known technologies for allowing an advertiser 98 to register, upload images such as JPEG, GIF, PDF files, edit the images (e.g., crop, resize, etc.), insert hyperlinks, e.g., to a users' website, etc. Ad contracts 97 created by contract module 92 may for example include: (1) an agreed upon price; (2) a time when the ad will appear; (3) the zone or zones on which it will appear; (4) terms of service; etc. Once a contract 97 is agreed upon, contract module 92 may employ any system for accepting payment, e.g., PayPal, credit cards, cryptocurrencies such as Bitcoin, etc.

Pricing system 96 sets the pricing for each advertisement for each zone. In some embodiments, pricing system 96 may determine when a submitted ad will appear in one or more correlated content sets (zones) and the cost to the advertiser 98 to place the ad. Pricing may be dictated based on any number of factors, e.g., current demand to place ads on a given wheel, the current price other advertisers are paying to be on the wheel, current availability, etc. In one simple approach, if there exists n spaces on a given wheel available for advertising, cost may be determined as follows:

If all n ad spaces are not filled,
then price for next ad=minimum set price/*possibly free*/
If all n ad spaces are filled,
then price for next ad=highest current ad rate for existing ads+increment.

CRM module 94 may be utilized to notify the advertiser 98 of a advertiser's expiring ad contract 97, and provide a process for allowing the advertiser 98 to renew the ad contract 97 for an additional period at a recalculated price. Thus, if an advertiser 98 signed up for a 1 week contract for $1/day for a given zone, the content set may be full a week later so the new contract price for an additional week may be set at $1.10/day. Conversely, if demand fell, pricing may be reduced, e.g., to $0.90. Renewal contract terms may e.g., be emailed or otherwise communicated to advertisers.

Advertisement content items may be ranked, e.g., based on cost being paid by advertisers, with higher cost ads being ranked higher. In a further illustrative embodiment, feedback from end users may be collected and analyzed to further rank advertisements. Based on the ranking, timing, pricing and terms may be altered. For example, if an ad is highly liked, or its hyperlink is highly linked to over a predefined period of time, then the renewal pricing may be reduced, kept unchanged, or the advertisement time may be extended at no cost. Higher ranked ad content items may also receive more prominent location spaces on the virtual wheel.

Figure 7:
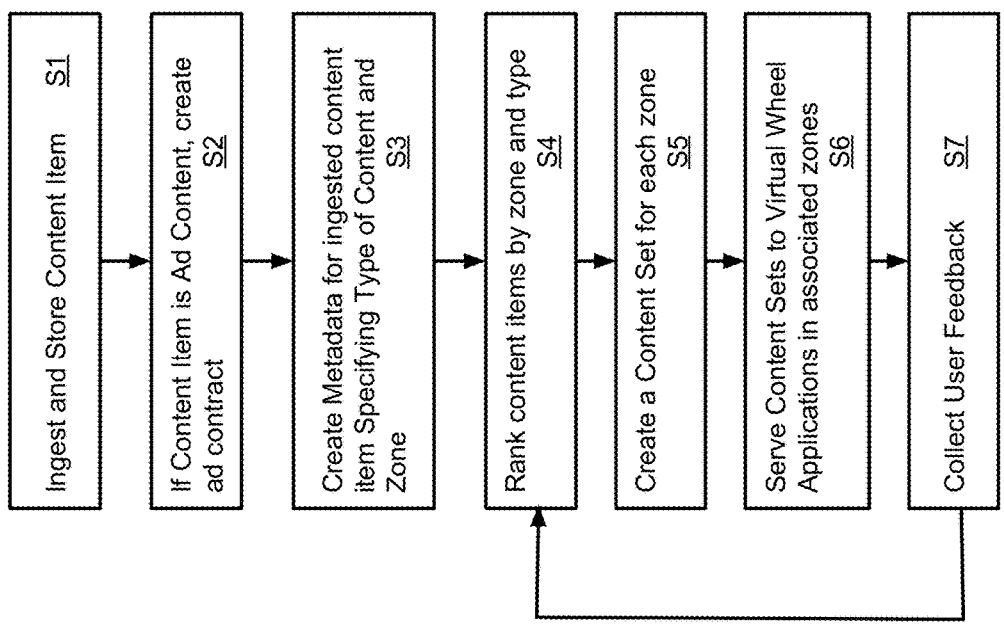
FIG. 7 depicts a flow diagram of a method of the invention.

FIG. 7 depicts a flow diagram for an illustrative method of implementing the virtual wheel system. At S1, a content item is ingested and stored. If the content item is ad content, create an ad contract including pricing, etc., at S2. At S3, metadata is created for each content item that specifies the type of content, the correlated zone(s), etc. At S4, content items are ranked for each zone and by possibly by type (i.e., ad content items are ranked separately than user content items). At S5, content sets are created for each zone and at S6, the content sets are served to virtual wheel applications in associated zones. At S7, user feedback is collected and the process loops such that content items are re-ranked at S4.

Figure 8:
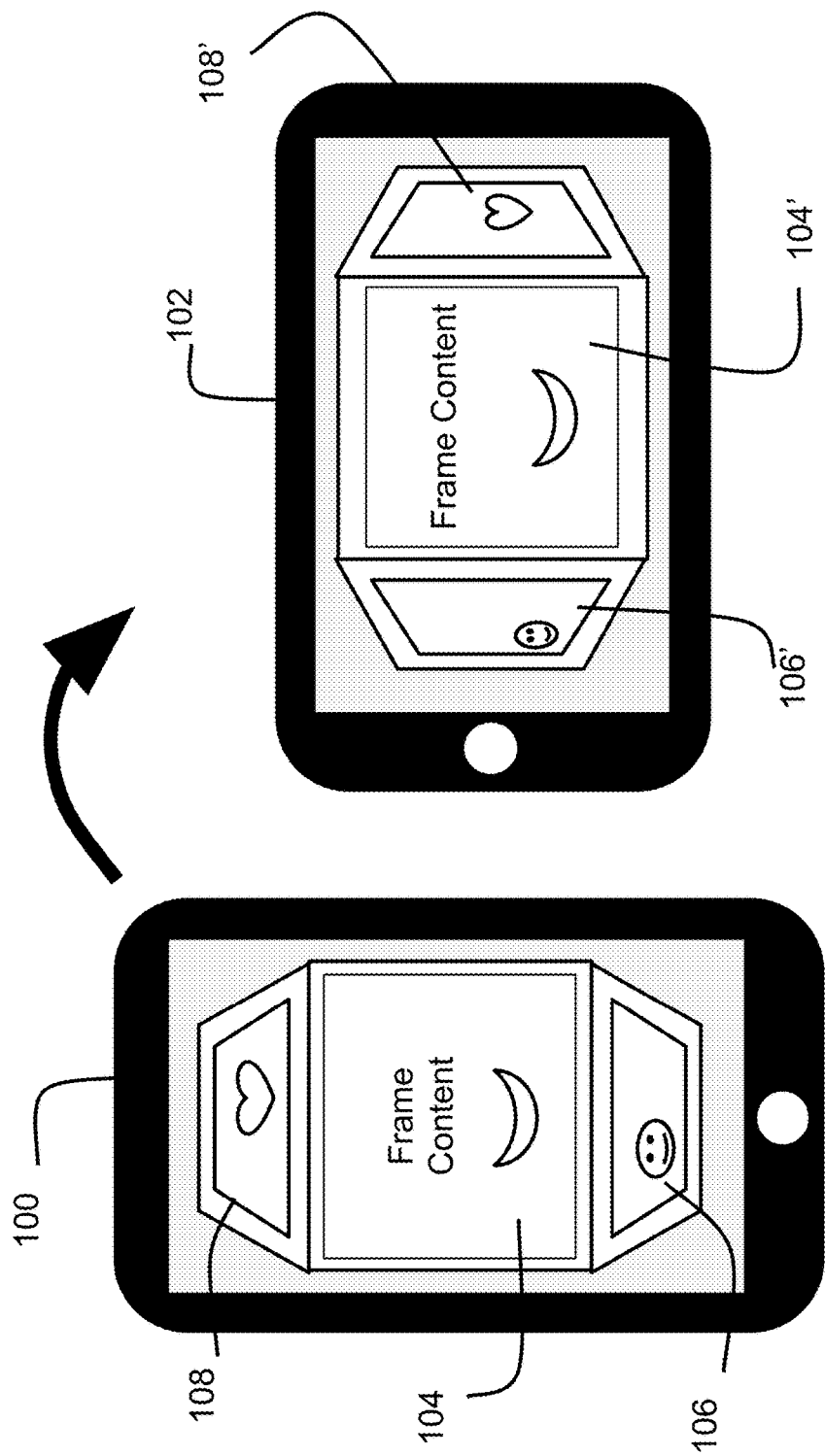
FIG. 8 depicts frames converting from portrait to landscape mode in accordance with an embodiment of the invention.

FIG. 8 depicts an illustration of the behavior of the virtual wheel when the smart device is rotated from portrait mode 100 to landscape mode 102. As can be seen, in portrait mode 100, the content wheel is oriented vertically, such that a user can rotate the wheel with upward or downward finger swipes. The content items 104, 106, 108 in each displayed frame are likewise vertically oriented for natural viewing by the user. When the device is rotated to landscape mode 102, the wheel rotates with the device such that the wheel is now horizontally oriented along with the device as shown. When in landscape mode 102, the user rotates the wheel by swiping left or right. However, each individual content item 104' 106' 108' is reoriented 90 degrees within their respective frames, such that the content items 104' 106' 108' appear vertically oriented for natural viewing. This thus allows content on the wheel to viewed naturally in both the portrait mode 100 and landscape mode 102.

As the user switches back and forth between portrait mode 100 and landscape mode 102, the smart device will generate signals that are read and processed by the virtual wheel application. In response to a switch, individual content items are dynamically reoriented (i.e., rotated) within each frame in a seamless manner.

Figure 9:
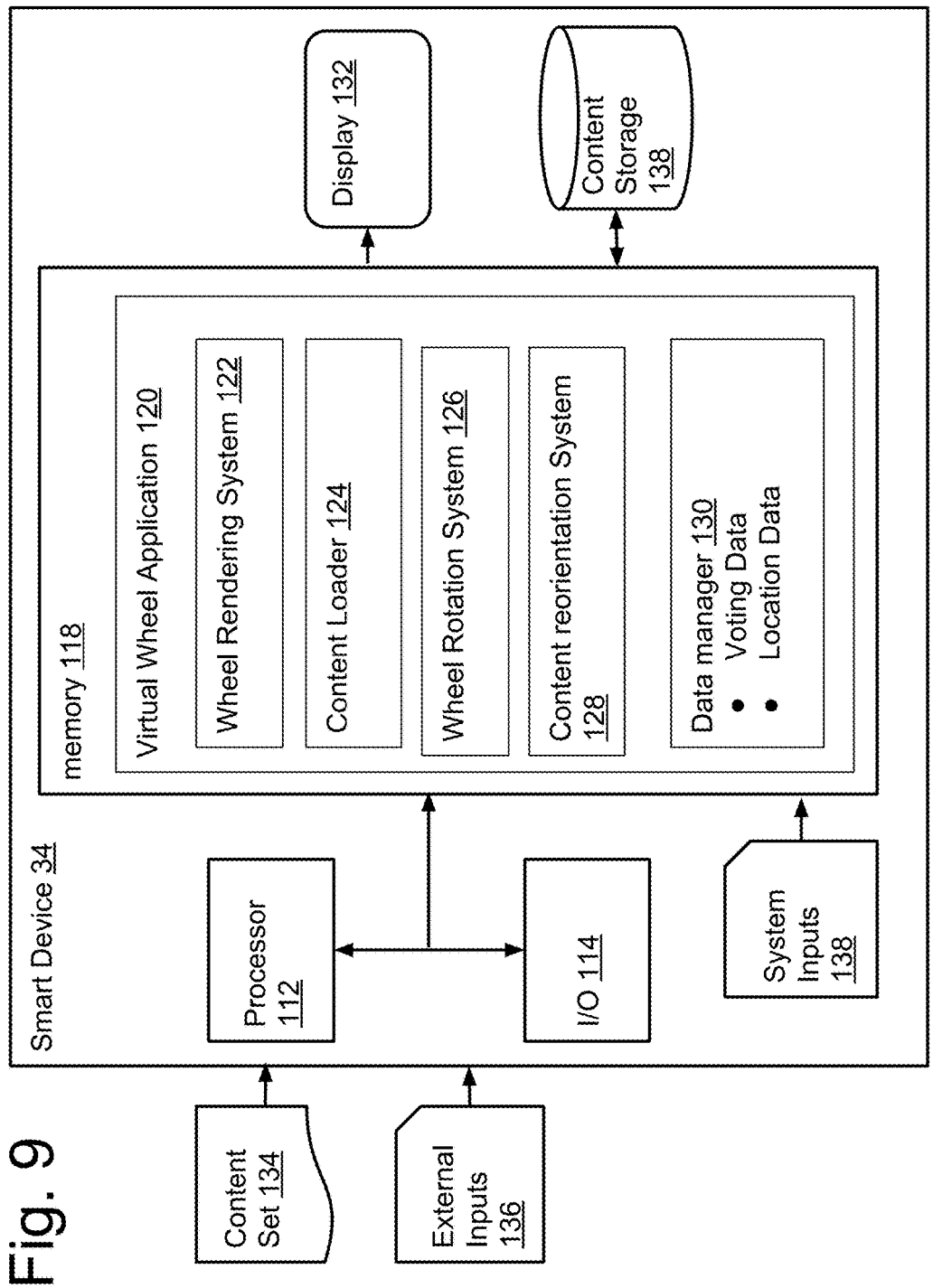
FIG. 9 depicts a smart device having a virtual wheel application in accordance with embodiments.

FIG. 9 depicts a system overview of a smart device 34 running a virtual wheel application 120. Virtual wheel application 120 generally includes: (1) a wheel rendering system 122 that renders an "end-on" view of adjacent content frames located about an outer edge of a rotatable n-sided polygonal prism; (2) a content loader 124 that loads content items from an imported content set 134 or from internal content storage 138, such as a hard drive, a RAM device, a ROM device, etc; (3) a wheel rotation system 126 that causes the rendered wheel to appear to rotate in response to an external input 136, such as a detected user swipe on display 132, press of a button, a wireless signal, voice command, motion detection, etc; (4) a content reorientation system 128 for dynamically reorienting content items appearing in the adjacent content frames in response to a system input 138 indicating a switch between a landscape mode and a portrait mode; and (5) a data manager 130 that, e.g., manages data communications with a content server, collects voting data, captures location data, etc.

Aspects of the present invention may be implemented as a system, a method, and/or a computer program product. The computer program product may include a computer readable storage medium (or media) having computer readable program instructions thereon for causing a processor to carry out aspects of the present invention. The virtual wheel application may use any available programming language/platform to render, rotate and reorient data. For example, a native mobile application for iOS may be written in Objective-C, while an Android version may be written in Java.

One approach for implemented the virtual wheel may include using HTML5 to render flat vertically stacked panels on the display. Functionality built into JavaScript may then be used to rotate the panels so they appear to be in a hex-nut shape. JavaScript may also be used to track user clicks/taps/drags to simulate dragging/spinning. To reorient content when switching between portrait and landscape modes, transformations that are built within JavaScript can be used independently rotate every content item on the page.

Two illustrative approaches for loading images and placing them on the wheel include: (1) when the App is launched, implement a Python back-end (e.g., running the Flask framework) to identify and utilize the user's location to find which zones they are in, and then query a MySQL database to find the url's of all the content items for each relevant zone; (2) when the user selects a new zone, use AJAX to call the Python back-end that runs the same process while giving extra preference to the newly selected zone.

The computer readable storage medium for any of the described software can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages, markup languages such as HTML5, etc. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 for example depicts an illustrative computer system 10 that may comprise any type of computing device and, and for example includes at least one processor 12, memory 16, an input/output (I/O) 14 (e.g., one or more I/O interfaces and/or devices), and a communications pathway 17. In general, processor(s) 12 execute program code, such as virtual wheel content system 20, which is at least partially fixed in memory 16. While executing program code, processor(s) 12 can process data, which can result in reading and/or writing transformed data from/to memory 16 and/or I/O 14 for further processing. Pathway 17 provides a communications link between each of the components in computer system 10. I/O 14 can comprise one or more human I/O devices, which enable a user to interact with computer system 40. To this extent, virtual wheel content system 20 can manage a set of interfaces (e.g., graphical user interfaces, application program interfaces, etc.) that enable humans and/or other systems to interact with the virtual wheel content system 20. Further, virtual wheel content system 20 can manage (e.g., store, retrieve, create, manipulate, organize, present, etc.) data using any solution. FIG. 9 depicts a similar computing infrastructure embodied in a smart device.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A program product stored on a computer readable storage medium, which when executed by a computer system, renders a virtual content wheel, and comprises:
    program code for rendering a virtual wheel on a mobile device within an end user application, wherein the virtual wheel includes a plurality of content frames rotationally viewable about an outer edge of the virtual wheel by a user running the end user application on the mobile device;
    program code for loading content items into the content frames of the virtual wheel that include user content items that are loadable from the mobile device onto the virtual wheel by the user while the user is running the end user application; and
    program code for causing the virtual wheel to rotate in response to an external input from the user running the end user application;
    wherein the virtual wheel is rendered as an outer edge of an n-sided polygonal prism having a plurality of facets that form frames, such that a primary frame displays a first content item in a rectangular enclosure and two contiguously joined adjacent frames display second and third content items in trapezoidal enclosures in which each adjacent frame has a first edge shared with the primary frame and a second parallel edge that is shorter than the first edge.

2. The program product of claim 1, further comprising program code that launches one of a web page, video player and a photo viewer in response to a second external input.

3. The program product of claim 1, wherein a full rotation of the virtual wheel results in a repeated display of content frames.

4. The program product of claim 1, wherein the second and third content items are displayed in their entirety within the trapezoidal enclosures.

5. The program product of claim 4, wherein content items displayed in the adjacent content frames are compressed into a trapezoidal form to appear skewed.

6. The program product of claim 1, further comprising program code for changing a number of content frames associated with the virtual wheel.

7. The program product of claim 1, further comprising program code for reorienting individual contents items relative to the content wheel in response to the content wheel switching between a landscape mode and a portrait mode.

8. A computing system for displaying a virtual content wheel, comprising:
    a system for rendering a virtual wheel on a mobile device within an end user application, wherein the virtual wheel includes a plurality of content frames rotationally viewable by a user running the end user application about an outer edge of the virtual wheel;
    a system for loading content items into the content frames of the virtual wheel that include user content items that are loadable from the mobile device onto the virtual wheel by the user while the user is running the end user application; and
    a system for causing the virtual wheel to rotate in response to an external input from the user running the user application;
    wherein the virtual wheel is rendered as an outer edge of n-sided polygonal prism, such that a primary frame displays a first content item in a rectangular enclosure and two contiguously joined adjacent frames display second and third content items in trapezoidal enclosures in which each adjacent frame has a first edge shared with the primary content wheel and a second parallel edge that is shorter than the first edge.

9. The system of claim 8, wherein the computing system comprises a handheld device and the external input comprises a swipe.

10. A method of displaying a virtual content wheel, comprising:
    rendering a virtual wheel on a mobile device within an end user application, wherein the virtual wheel includes a plurality of content frames rotationally viewable about an outer edge of the virtual wheel by a user running the end user application;
    rotating the virtual wheel to rotate in response to an external input from the user running the user application;
    loading content items into the content frames of the virtual wheel that include user content items that are loadable onto the virtual wheel from the mobile device by the user while the user is running the end user application; and
    wherein the virtual wheel is rendered as an outer edge of n-sided polygonal prism, such that a primary frame displays a first content item in a rectangular enclosure and two contiguously joined adjacent frames display second and third content items in trapezoidal enclosures in which each adjacent frame has a first edge shared with the primary content wheel and a second parallel edge that is shorter than the first edge.

* * * * *